Inventor
L. Namenyi-Katz
By Glascock Downing & Seebold
Attys.

March 5, 1963 L. NAMENYI-KATZ 3,080,455

MAGNETIC RECORDING HEADS

Filed Nov. 16, 1959 2 Sheets-Sheet 2

Inventor
L. Namenyi-Katz
By Glascock Downing & Seebold Attys 3,080,455
Patented Mar. 5, 1963

3,080,455

MAGNETIC RECORDING HEADS

Laszlo Nameny-Katz, Bedfont, Feltham, England, assignor to Epsylon Research and Development Company Limited, Bedfont, Feltham, England Filed Nov. 16, 1959, Ser. No. 853,038
Claims priority, application Great Britain Dec. 17, 1958
3 Claims. (Cl. 179—100.2)

This invention relates to mechanism for moving a magnetic head from track to track on a multi-track magnetic recording tape in a tape recorder, and more particularly to a mechanism of this kind which is especially suitable for use in a small self-contained recorder which may readily be carried in the pocket of a garment of clothing or in a hand-bag.

The process of magnetic recording on tape is now well known and consists in moving a tape coated with or impregnated with magnetizable material past a recording head comprising a magnetic circuit provided with a winding and having a gap. Signal currents are passed through the winding to set up a varying magnetic flux at the gap. The tape is selectively magnetized as it passes the gap so that a magnetic record is made of the signal currents. Reproduction, or playback as it is often called, is carried out by moving the tape past the same or a similar head having its winding connected to an amplifier and loudspeaker, or to other apparatus. The record may be erased by moving the tape past a similar head, the winding of which is supplied with a "erase" current.

Sometimes a single head is used for recording, playback and erasure while in other cases separate heads are provided for the separate functions. The term "magnetic head" is used herein to signify either a single head or a plurality of heads used for different purposes since the invention may be used with either arrangement.

A fully satisfactory magnetic record may be made on quite a narrow track on the tape. For example, it is possible to record 40 parallel tracks side by side on a tape having a width of one inch (25 millimetres) and the magnetic head may be moved transversely of the tape in order to play back from any selected track. The invention is concerned with a mechanism by which the magnetic head is first set to record upon or play back from the first track, near one edge of the tape, and is then moved in successive steps to each of the other track positions in turn. Such a mechanism is particularly well adapted for use in a pocket tape recorder, but it is to be understood that the invention is not limited to pocket tape recorders.

In a pocket tape recorder very severe restrictions are placed upon size, weight and electrical power consumption, and it is necessary to ensure that the best possible use is made of a limited amount of tape. In one form of recorder the tape is in the form of an endless loop which is loosely accommodated in a magazine, being fed out of the magazine past the magnetic head and then returned to the magazine. If when recording upon an endless loop, a first track is recorded and the head is moved to the second track position just before the beginning of the first track is reached the transition is not noticeable in playing the recording back provided that the transition from track to track is always made at the correct instant. Thus it is possible, for example, to make a recording which passes 40 times round the endless band of tape and in which no break is detectable on playback. The relatively short length of tape which may be accommodated within the limited compass of a pocket recorder may, in this way, be made to provide a continuous recording of considerable length.

It is, of course, necessary to "mark" the tape at the point at which the head is to be changed from one track to the next. More than one method of marking is already known; for example, a small electrically conducting area may be formed on the uncoated face of the tape, that is, the face not coated with the magnetic oxide used for recording. The mark may consist of a small strip of metal foil cemented on to the face. Alternatively, a small transparent or translucent portion may be formed by removing the oxide coating at a small area adjacent one edge of the tape where it will not cut through any of the recording tracks. A small nick may be made in the edge of the tape or a "change" signal may be recorded at the desired point on an extra track.

In a known type of tape recorder which is power driven from electric supply mains, the magnetic head is mounted in a slide adapted to move transversely of the tape and the slide is acted upon in one direction by a face cam in the form of a single-turn helix with a step between the two ends of the helix turn, and in the other direction by a compression spring. The cam is rotated in small steps by a power-operated intermittent ratchet mechanism against the pressure of the spring. The magnetic tape is "marked" at each end by any of the means described.

In operation, and assuming that the magnetic head is travelling along one track, a point is reached at which the mark on the tape energizes the change mechanism and at this instant the power-operated ratchet mechanism rotates the cam through a predetermined angle to move the slide with the magnetic head from one track to the next against the force of the spring and, at the same time, the direction of the tape movement is reversed, so that the head travels back along the tape on the next track. After the last track has been completed the step on the cam allows the head to be returned to the first track. Thus the recorder will play continuously and repeat its programme. It is, of course, necessary that there shall be an even number of tracks on the tape to allow this repetition.

One object of the invention is to provide a mechanism for moving a magnetic head successively from one track to another on a magnetic tape in a tape recorder which is simple, compact and reliable in operation.

Another object is to provide a mechanism in which the energy required to move the head is supplied by a spring which is initially wound up by hand, so that the power required to release the mechanism to move the head is very small.

A further object is to provide a mechanism in which the movement of the magnetic head is controlled by a screw which is permitted to turn through a predetermined angle, whereby the movement of the head may be controlled with micrometer precision.

Still another object is to provide a mechanism in which the movement of the magnetic head is controlled by an escapement.

A still further object is to provide a mechanism which by virtue of its small size, compactness, light weight, precision in operation and small power requirement is well adapted for use in a pocket tape recorder.

The invention consists of a mechanism for moving a magnetic head successively from one track to another on a magnetic recording tape in a tape recorder comprising spring-urged means to move the magnetic head transversely of the tape, an escapement mechanism which permits the spring-urged means to move the magnetic head by one track width at each actuation, and means to actuate the escapement each time a marked portion of the tape passes a predetermined point.

Conveniently the means to move the magnetic head comprises a screw coupled to the magnetic head which is urged to rotate by a spring of scroll form such as a clock spring, the screw being rotated initially to bring the magnetic head into position on the first or other desired track and at the same time to wind up the spring. The escapement may consist of a toothed escapement wheel connected to the screw and two co-operating pallets formed on a pallet plate. The pallet which normally holds the escapement wheel may be pivoted and kept in its normal working position by a spring to permit the pallet to move clear of the teeth of the escapement wheel when the scroll spring is wound up by rotating the screw.

The magnetic head may be mounted in a yoke adapted to move transversely of the tape, the yoke being engaged by a nut carried on the screw. The yoke may be located by two arms pivotally coupled both to the yoke and to the fixed structure of the recorder, arranged so that the axes of the four pivots define a parallelogram. Adjusting means may be provided to enable the magnetic head to be initially set to its correct position in azimuth within the yoke.

The actuating means for the escapement may be a solenoid acting upon an armature connected to the pallet plate.

An indicator to indicate the number of the track to which the magnetic head has been moved may be provided and this may conveniently be coupled to the screw by means of gears.

In order that the invention may be more clearly understood a preferred embodiment will now be described, by way of example, with reference to the accompanying drawings in which.

Figure 1:
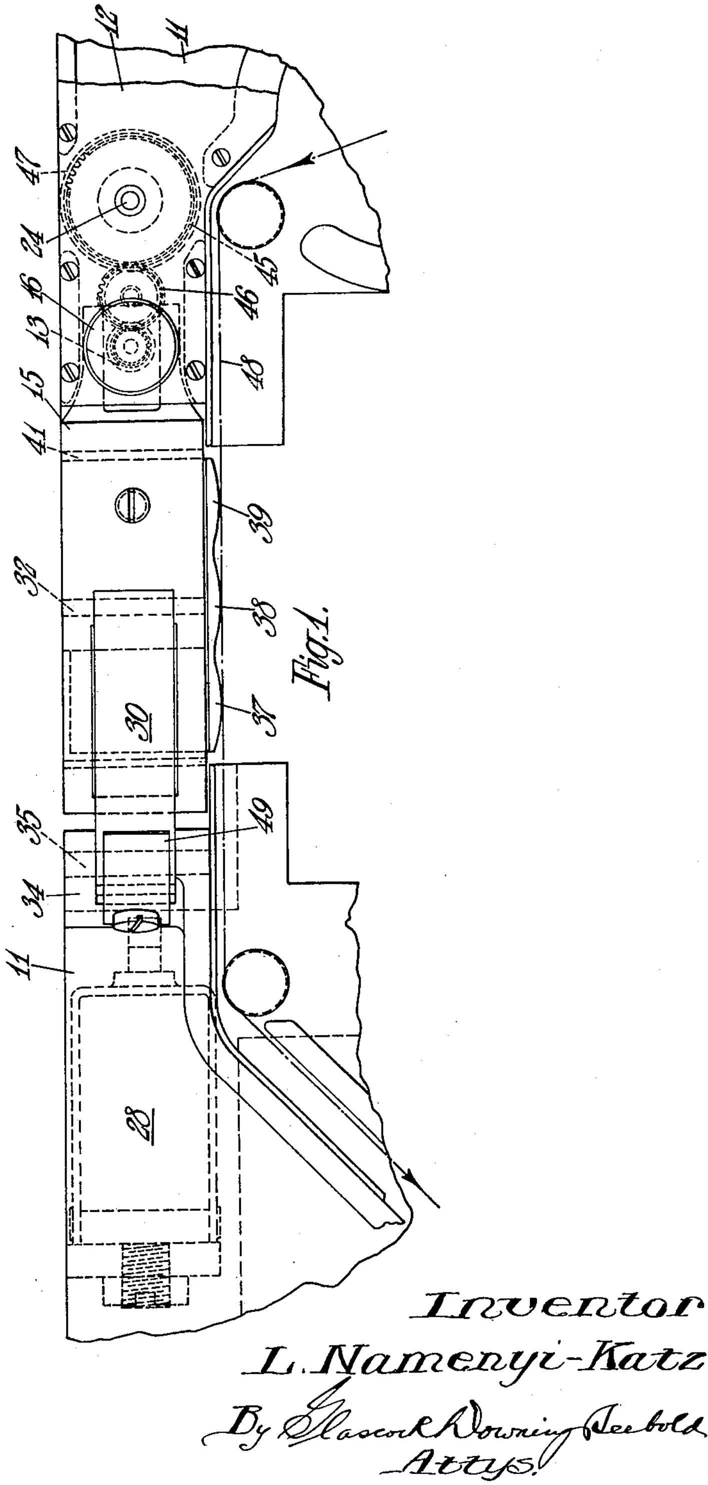
FIGURE 1 is a substantially enlarged plan view of a mechanism according to the invention.

Referring to the drawings, the base of a magnetic tape recorder is indicated at several points by reference 11. Mounted above the base at one point is a plate 12, and a screw 13 is carried between bearings in the base 11 and plate 12. A nut 14 on the screw 13 is circumferentially grooved to receive the forked end of a yoke 15. A knob 16 is fixed to the upper end of the screw 13 and an extension at the lower end thereof engages a scroll spring 17, such as a clock spring, one end of which is anchored to the base, the arrangement being such that as the knob is turned in the direction to raise the nut 14 and yoke 15 the spring 17 is wound up.

Figures 2, 3:
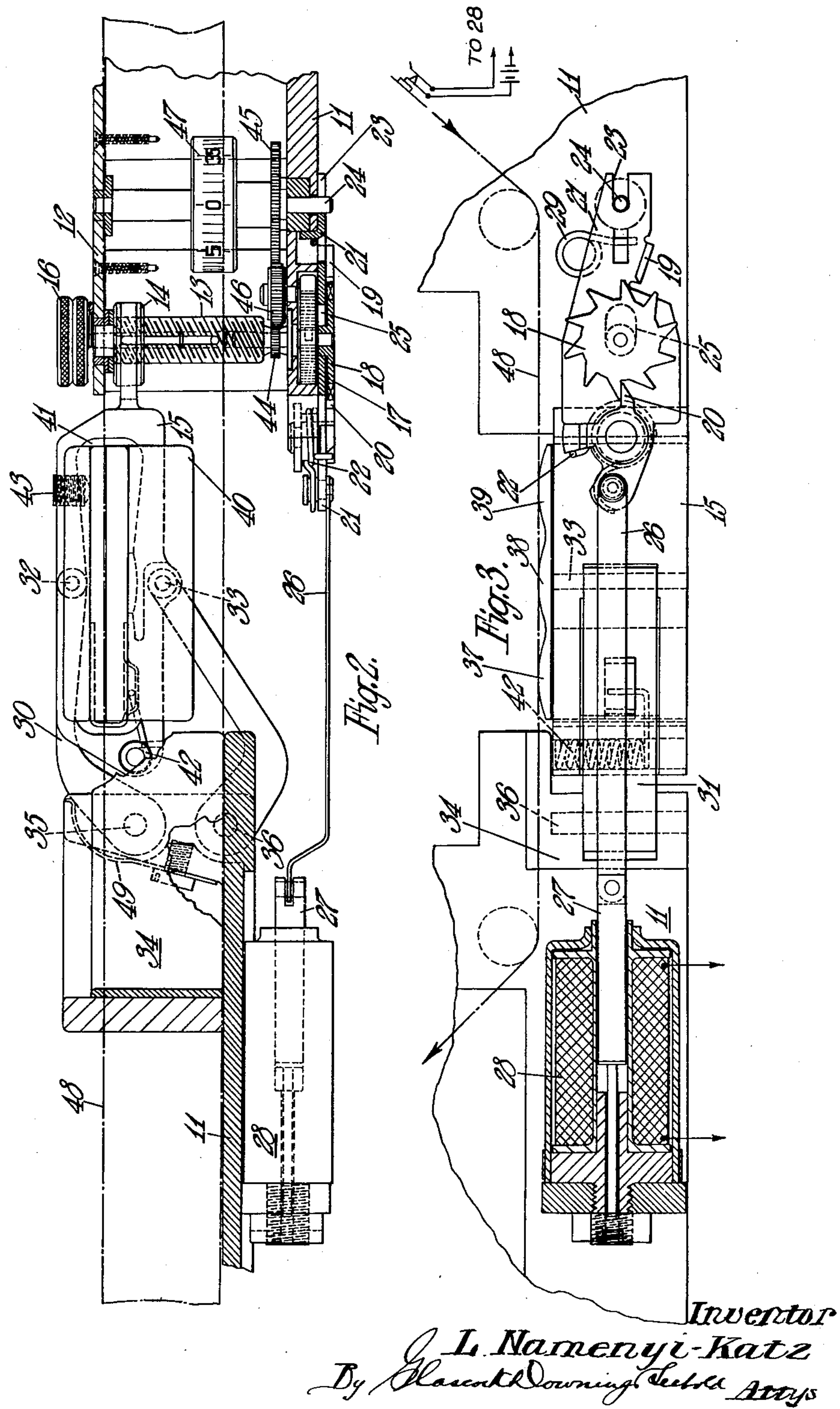
FIGURE 2 is a side elevation of the mechanism of FIGURE 1.
FIGURE 3 is an inverted plan view of the same mechanism.

An escapement wheel 18 is secured to the lower end of the extension of the screw 13 and is engaged by two pallets 19 and 20, the pallet 19 being fixed to the plate 21 and the pallet 20 being pivoted on a pin on the plate and urged by a spring 22 to its normal working position, as shown in the drawing, against a stop. When the knob 16 is turned to raise the yoke 15 and wind up the spring 17 the escapement wheel 18 turns in a clockwise direction (in FIGURE 3) and the pallet 20 is pushed aside by each tooth of the escapement wheel in turn.

The pallet plate 21 has a slot 23 near one end, which is engaged by the lower end of a spindle 24, and a second slot 25, in line with and spaced from slot 23, which is engaged by a boss on the escapement wheel 18, so that the pallet plate may move from right to left (in FIGURE 3) to a limited extent. The end of the pallet plate remote from the slot 23 is coupled to one end of a connecting link 26, the other end of which is coupled to the armature 27 associated with a solenoid 28. When the solenoid is not energized the pallet plate is retained in the right-hand position by a spring 29 so that one of the teeth of the escapement wheel is normally engaged by the pivoted pallet 20.

The yoke 15 is located by two arms 30 and 31, respectively above and below it, the arms being coupled to the yoke by two pins 32 and 33. At their other ends, the arms 30 and 31 are coupled to a bracket 34, mounted on the base 11, by two pins 35 and 36. The centre distance between pins 32 and 33 is equal to that between pins 35 and 36, and the centre distance between the pin holes in the arm 30 is equal to that between the pin holes in the arm 31, so that the axes of the four pins always define a parallelogram. As the result of this disposition of the parts the yoke 15 is able to move up and down in response to rotation of the screw 13, following an arc determined by the centre distance of the pin holes in the two arms 30 and 31, but it always maintains its azimuth position. A leaf spring 49 permanently takes up all play in the linkage associated with the yoke in one direction.

A magnetic head consisting of playback, record and erace heads 37, 38 and 39 is contained in a single casing 40. The casing 40 has a rearwardly projecting portion which is supported in a slot 41 in the yoke 15, the slot being wider at its ends than at its middle. The rearwardly projecting portion of the casing 40 rests in the middle portion of the lower edge of the slot 41. A spring 42 which is anchored to the yoke 15 pulls the left-hand end of the casing 40 downwards and a screw 43 acts at the right-hand end of the casing against the pull of the spring. This screw enables the azimuth position of the magnetic head to be initially adjusted within the yoke 15.

A pinion 44 mounted below the screw 13 is engaged with a gear 45 mounted on the spindle 24 through an idler gear 46. The spindle 24, which is carried in bearings in the plate 12 and the base 11, is provided with a disc 47 having scale markings around its periphery with suitable numerical markings to form a scale reading from 1 to 40.

The tape, indicated by the chain dotted line 48, is arranged to follow a fixed path past the heads 37, 38 and 39.

The operation of the mechanism is as follows. The tape having been placed in position, the knob 16 is rotated until the yoke and the magnetic head are in their uppermost positions, when the indicator on the disc 47 reads "1" and the magnetic head is in contact with the first track on the tape. The spring 17 is wound up by rotation of the knob 16. The starting position of the tape is suitably marked, either by a conducting area, a special recorded signal or by a mechanical mark, such as a nick in its edge. Alternatively a device to measure the length of tape passing the magnetic head may be employed. Recording is commenced and continues along the first track until almost the whole length of the endless band has passed the magnetic head. At this point the conducting area, the recorded signal, or the mechanical mark is sensed by suitable means and causes the solenoid 28 to be energized. The armature 27, through the link 26, pulls the pallet plate 21 to the left thus releasing the escapement wheel 18, which rotates by almost one tooth, until stopped by the pallet 19 and, when the solenoid is de-energized, by the remaining amount so that the next tooth is engaged by the pallet 20. Rotation of the escapement wheel permits rotation of the screw 13 to move the yoke 15 and the magnetic head downwards by one track width so that the magnetic head is now following the second track. Rotation of the screw 13 also moves the indicator so that it indicates "2." This sequence is followed through the whole of the 40 tracks.

Since recording continues normally while the magnetic head is executing its downward movement the change from one track to another is not noticeable during playback. It is only necessary to make quite sure that the head moves from one track to the next at exactly the same spot on the tape, exactly the same spot on the tape, and this is assured by the mark on the tape.

It will be understood that numerous modifications may be made to the mechanism herein described without departing fro the scope of the invention as defined by the appended claims.

I claim:

1. A mechanism for moving a magnetic head successively from one track to another on a marked magnetic recording tape in a tape recorder having framework, comprising a screw to move said magnetic head transversely of said tape, first spring means to urge said screw to rotate to move said head, manual means to wind up said first spring means by rotating said screw against said spring whereby said magnetic head is moved to a desired track on said tape, an escapement comprising a toothed escapement wheel connected to said screw and two co-operating pallets on a pallet plate, the one of said pallets which normally holds said escapement wheel being pivoted, second spring means to keep said one pallet in its working position, whereby said one pallet is moved clear of each tooth of said escapement wheel when said first spring means is wound up by rotation of said screw, a yoke in which said magnetic head is mounted, two arms pivotally coupled at one end to said yoke and pivotally coupled at the other end to the framework of said recorder arranged so that the axes of the four pivots of said arms define a parallelogram, a nut carried on said screw engaging said yoke, adjusting means for initially setting said magnetic head to its correct position in azimuth within said yoke, and indicator means coupled to said screw to indicate the number of the track to which said magnetic head has been moved.

2. A mechanism as claimed in claim 1, wherein said indicator means comprises a drum on a spindle, the drum having markings around its periphery to indicate the track number, and gearing between said screw and said spindle carrying said drum.

3. A mechanism for moving a magnetic head successively from one track to another on a marked magnetic tape in a tape recorder having framework, comprising a screw to move said magnetic head transversely of said tape, first spring means to urge said screw to rotate and move said head, manually operated means to wind up said first spring means by rotating said screw whereby said magnetic head is moved to a desired track on said tape, an escapement comprising a toothed escape wheel connected to said screw and two co-operating pallets on a pallet plate, the one of said pallets which normally holds said escapement wheel being pivoted, second spring means to keep said one pallet in its working position, whereby said one pallet is moved clear of each tooth of said escapement wheel when said first spring means is wound up by rotation of said screw, a yoke in which said magnetic head is mounted, two arms pivotally coupled at one end to said yoke and pivotally coupled at the other end to said framework of said recorder arranged so that the axes of the four pivots of said arms define a parallelogram, and means engaging said pallet plate and responsive to the passage of a mark on said tape to allow said escapement to rotate by one tooth to engage the adjacent track on said tape.

References Cited in the file of this patent

UNITED STATES PATENTS

| | | |
|---|---|---|
| 2,109,627 | Finch | Mar. 1, 1938 |
| 2,275,961 | Heller | Mar. 10, 1942 |
| 2,292,856 | Woolf et al. | Aug. 11, 1942 |
| 2,514,578 | Heller | July 11, 1950 |
| 2,609,457 | Thurm | Sept. 2, 1952 |
| 2,668,059 | Roberts | Feb. 2, 1954 |
| 2,783,651 | Grea et al. | Mar. 5, 1957 |